United States Patent

[11] 3,593,393

| [72] | Inventor | George G. Ware |
| | | 609 S. Lake St., Forth Worth, Tex. 76104 |
| [21] | Appl. No. | 791,264 |
| [22] | Filed | Jan. 15, 1969 |
| [45] | Patented | July 20, 1971 |

[54] METHOD OF TREATING WASTE MATERIAL
4 Claims, 1 Drawing Fig.

[52] U.S. Cl............................................. 27/24 R
[51] Int. Cl.............................................. A01n 1/00
[50] Field of Search.......................................27/24, 24.1,
21, 22; 128/276—278, 347, 224, 227, 229, 240,
283, 295, 275; 4/222, 225, 227

[56] References Cited
UNITED STATES PATENTS

| 711,394 | 10/1902 | Grant............................ | 27/24 |
| 946,256 | 1/1910 | McNerthney................. | 27/24 X |
| 972,878 | 10/1910 | Leon............................. | 27/24 |
| 2,804,075 | 9/1957 | Borden......................... | 128/277 |
| 3,312,221 | 4/1967 | Overment..................... | 128/275 |

Primary Examiner—Richard A. Gaudet
Assistant Examiner—J. B. Mitchell
Attorney—Wofford and Felsman ABSTRACT: This specification discloses method and apparatus for treating waste material; such as, that from a dead body containing living organisms that are likely to be dangerous; characterized by injecting a substance into a closed conduit near the point where the waste material is removed from the body and circulating the admixture of the toxic substance and the waste material through a closed conduit for a sufficient period for the toxic substance to kill the living organisms. Thereafter, the admixture is discharged into a waste disposal means; such as, a sink and its drain line.

PATENTED JUL 20 1971
3,593,393
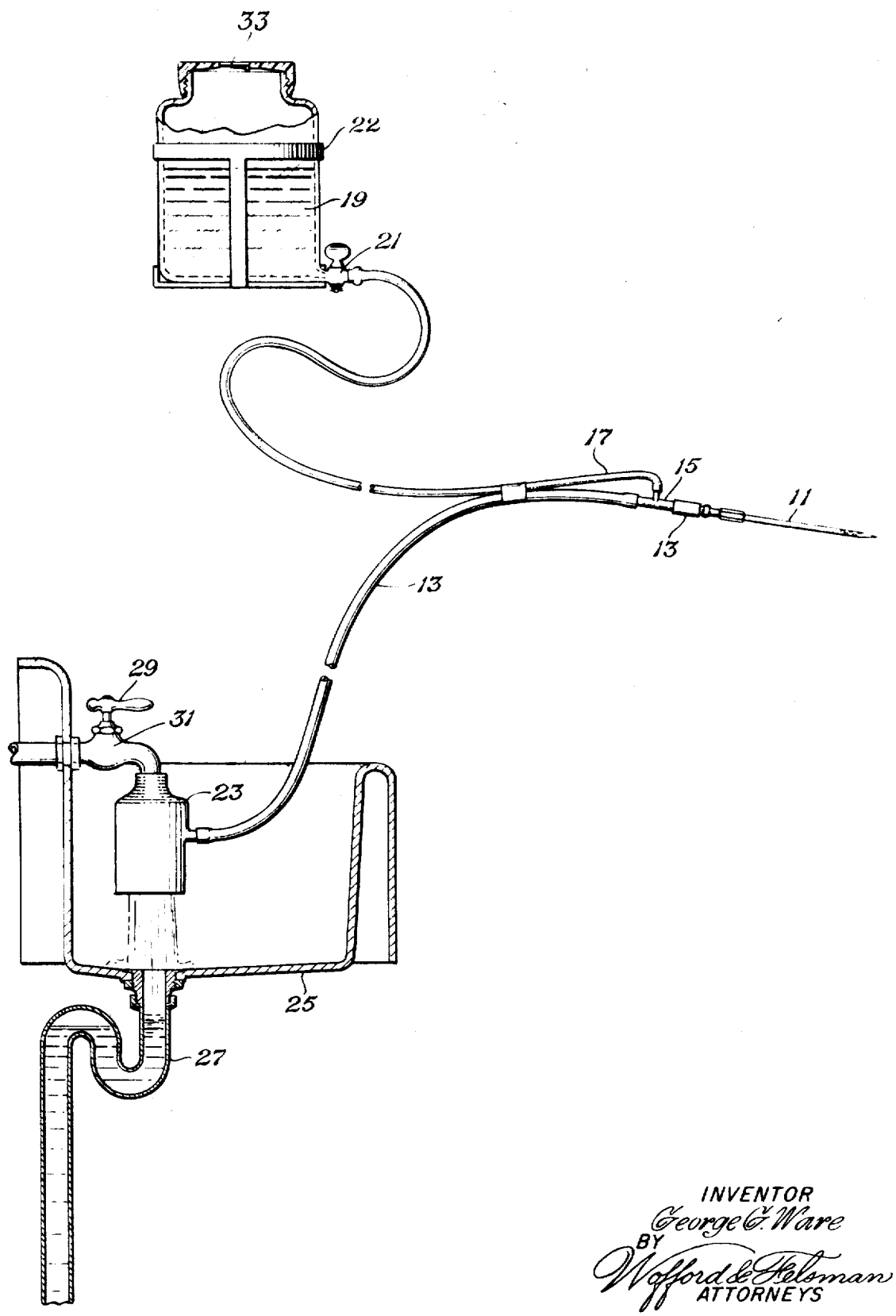
INVENTOR
George G. Ware
BY
Wofford & Felsman
ATTORNEYS

METHOD OF TREATING WASTE MATERIAL

BACKGROUND OF THE INVENTION

1. Field of the Invention

The invention relates generally to the treatment of waste material from bodies. More particularly, however, it relates to a method for treating the waste material withdrawn from dead bodies prior to burial and after embalming.

2. Description of the Prior Art

In the embalming art, it has been common practice to insert an instrument called a trocar into portions of the dead body at locations of various body cavities and organs in order to withdraw from the body various fluids and waste materials, generally of fluidlike character even though containing solid material. A dead body is frequently referred to and may be referred to herein as a cadaver. The word cadaver is used herein in its broad sense without the limitation that the body be intended for dissection, or that has been embalmed.

In the prior art processes, the fluidlike materials and any dangerous living organisms therein withdrawn from the cadaver have been flushed into an open sink with concomitant danger to personnel in the room with the cadaver; as well as to the public in general in flushing into the public sewer.

The prior art has included methods of treating the gases off of material drawn from an open wound or similar unrelated processes but have not solved the problem of alleviating danger from disposing of materials from a cadaver containing living organisms that might be dangerous.

BRIEF DESCRIPTION OF THE DRAWING

The FIGURE is an elevation view, partly in section, of an apparatus used in one embodiment of the invention.

DESCRIPTION OF PREFERRED EMBODIMENT(S)

It is a primary feature of the invention to treat waste material from a cadaver containing living organisms that are probably dangerous by injecting a substance that is toxic to the living organisms at a point near the point of withdrawal of the waste material from the cadaver and circulating the admixture of the waste material and the toxic substance through a closed conduit for a sufficient length of time to enable the toxic substance to kill the living organisms before being discharged into a waste disposal means. This technique alleviates the problems associated with exposure of personnel in the room where the waste materials are discharged into a waste disposal means, as well as exposure of the public generally.

The primary and other features of the invention may be accomplished with apparatus such as shown in the FIGURE. Therein, insertion means such as trocar 11 is connected with a first conduit means 13. The insertion means is adapted for penetrating a portion of a cadaver and for conveying the fluidlike waste materials therefrom and into the first conduit means. The fluidlike waste materials from the cadaver frequently contain living organisms that are likely to be harmful. The living organisms will ordinarily be bacteria or germs, which may have caused the demise of the person represented by the cadaver. Rarely, these living organisms may be viruses such as those causing rabies or smallpox. Ordinarily, however, the living organisms will be bacterial. For example, the living organisms may be tuberculum bacillus causing tuberculosis. It is obviously undesirable to expose personnel to such bacillus.

Accordingly, I have found that such exposure can be prevented by injecting into first conduit means 13 adjacent the insertion means 11 a substance that is toxic to the living organisms in the waste material. For example, the substance that is toxic to the living organisms may be injected into first conduit means 13 at tee 15 through second conduit means 17. Tee 15 is located as near as practical to trocar 11 to minimize the length of first conduit means required, as discussed hereinafter. A reservoir means such as jar 19 is provided for storing the substance toxic to the living organisms. The substance exits from reservoir 19 into second conduit means 17, usually by a valving means such as valve 21. For example, when tuberculum bacillus is the living organism in the waste material, an alcohol solution containing 2 percent by weight of iodine is an excellent substance toxic to the living organism. On the other hand, an organic mercury compound commercially available under the trade name Metaphen and containing the organic mercury in a concentration of about 0.1 percent by weight can also be employed. Reservoir means 19 is preferably located; such as, by bracket 22; at an elevation greater than the tee 15 to facilitate flow of the toxic substance into the first conduit means 13. Thus, the suction, or vacuum, can be adapted to obtain best results with the cadaver without having to overcome a negative head of the substance toxic to the living organisms.

A suction means; such as, hydroaspirator 23, is connected onto the first conduit means for creating a suction on the first conduit means and consequently on the insertion means 11 and second conduit means 17. The suction means should also effect deposition of the admixture of the waste material and the substance toxic to the living organisms into a waste disposal means; such as, sink 25 with its drain line 27.

First conduit means 13 must be long enough to reach from suction means; such as, hydroaspirator 23; to the portions of the cadaver from which materials are to be removed. Ordinarily, this length is adequate to allow sufficient contact time of the toxic substance to kill the living organisms in the waste material. Infrequently, it may be necessary that an additional length of first conduit means be interposed to allow adequate residence time for the toxic substance to kill the living organisms. Accordingly, it may be desirable to deliberately insert an additional coil of tubing; such as, the Nycor tubing which is ordinarily employed; in the first conduit means to take care of such a contingency.

Similarly, second conduit means 17 must be long enough to reach from reservoir means 19 to the remotest portion of the cadaver from which the waste material is to be withdrawn in order to be able to inject the toxic substance into the waste material at a point near the point of withdrawal from the cadaver and to allow adequate time for the toxic substance to kill the living organisms in the waste material.

In lieu of the hydroaspirator, serving as the preferred embodiment of the suction means, a vacuum pump may be employed as a suction means. It will ordinarily be advisable, when employing the vacuum pump, to insert a container in first conduit means. In this way the waste material is deposited in the container along with the toxic substance injected into the first conduit means and only effluent vapors will be taken to the vacuum pump. The effluent vapors discharged from the vacuum pump may be sent to a waste burner such as is conventionally employed to dispose of combustible wastes. The container inserted into first conduit means and serving as a waste disposal means, will afford additional residence time and ensure the death of the living organisms through interaction with the toxic substance.

In operation, trocar 11 is inserted into a portion of the cadaver from which the waste material is to be withdrawn. Water is turned through hydroaspirator 23 by opening handle 29 of faucet 31. Valve 21 is opened to admit the toxic substance from reservoir 19 to second conduit 17; ordinarily plastic tubing such as Nycor tubing. The toxic substance enters via tee 15 into first conduit means 13 and admixes with the waste material being sucked thereinto. The resulting admixture of toxic substance and waste material is drawn along first conduit means and ultimately copiously diluted with water in the hydroaspirator and dumped into sink 25 and thence through line 27 to waste. The toxic substance interacts with and kills the living organisms in the waste materials before the admixture reaches hydroaspirator 23.

The individual elements and materials of construction; such as, stainless steel trocars, plastic hoses and tubing, and glass jars serving as the reservoir means and having a conventional vacuum relief 33; are individually well known and do not require further description herein.

Thus, it can be seen that the invention enables treating of waste materials and alleviates the problems resulting from exposure of personnel and the public generally to living organisms that might be dangerous and contained in the waste materials.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. A method of treating waste material from a dead body comprising:

a. inserting trocar means into a portion of said body from which there is to be removed fluidlike waste material containing living organisms likely to be dangerous;
b. creating a suction on said trocar means;
c. admixing with said fluidlike waste material at a point near said trocar means a substance that is toxic to said living organisms;
d. conveying the admixture of said fluidlike waste material and said substance that is toxic to said living organisms through a closed conduit for a time interval sufficient for said substance to kill said living organisms; and
e. discharging said admixture into a waste disposal means.

2. The method of claim 1 wherein said suction is created by a hydroaspirator in which said admixture is also copiously diluted with water.

3. The method of claim 1 wherein said living organisms are bacteria and said substance that is toxic to said living organisms is a bactericide.

4. The method of claim 3 wherein said bacteria are tuberculum bacillus and said bactericide comprises an alcoholic solution containing about 2 percent by weight of iodine.